United States Patent [19]

McCorvey

[11] 3,999,740
[45] Dec. 28, 1976

[54] MIXING HEAD

[76] Inventor: Raymond S. McCorvey, P.O. Box 405, Galena Park, Tex. 77547

[22] Filed: Jan. 17, 1975

[21] Appl. No.: 541,876

[52] U.S. Cl. .............................. 259/8; 137/625.41
[51] Int. Cl.[2] .......................................... B01F 7/24
[58] Field of Search ............. 259/4, 6, 7, 8, 9, 97, 259/21, 22, 23, 24, 40, 41, 42, 43, 44; 137/625.41; 425/207, 208; 23/252

[56] References Cited

UNITED STATES PATENTS

| 3,051,455 | 8/1962 | Magester | 259/8 |
| 3,102,004 | 8/1963 | Grintz | 259/7 |
| 3,203,675 | 8/1965 | Ward | 259/7 |
| 3,212,128 | 10/1965 | Carlson | 259/7 |
| 3,297,306 | 1/1967 | Napier | 259/8 |
| 3,450,388 | 6/1969 | Stump | 259/8 |
| 3,741,441 | 6/1973 | Eberle | 259/7 |

Primary Examiner—Robert W. Jenkins
Attorney, Agent, or Firm—Vinson Elkins Searls Connally & Smith

[57] ABSTRACT

A mixing head having a housing, a mixing chamber in said housing, injection ports for dispensing fluid into the mixing chamber, a valve for controlling the dispensing of fluid through the ports, and means for mixing the fluid in the chamber. This abstract is neither intended to define the invention of the application which, of course, is measured by the claims, nor is it intended to be limiting as to the scope of the invention in any way.

8 Claims, 3 Drawing Figures

U.S. Patent   Dec. 28, 1976   3,999,740
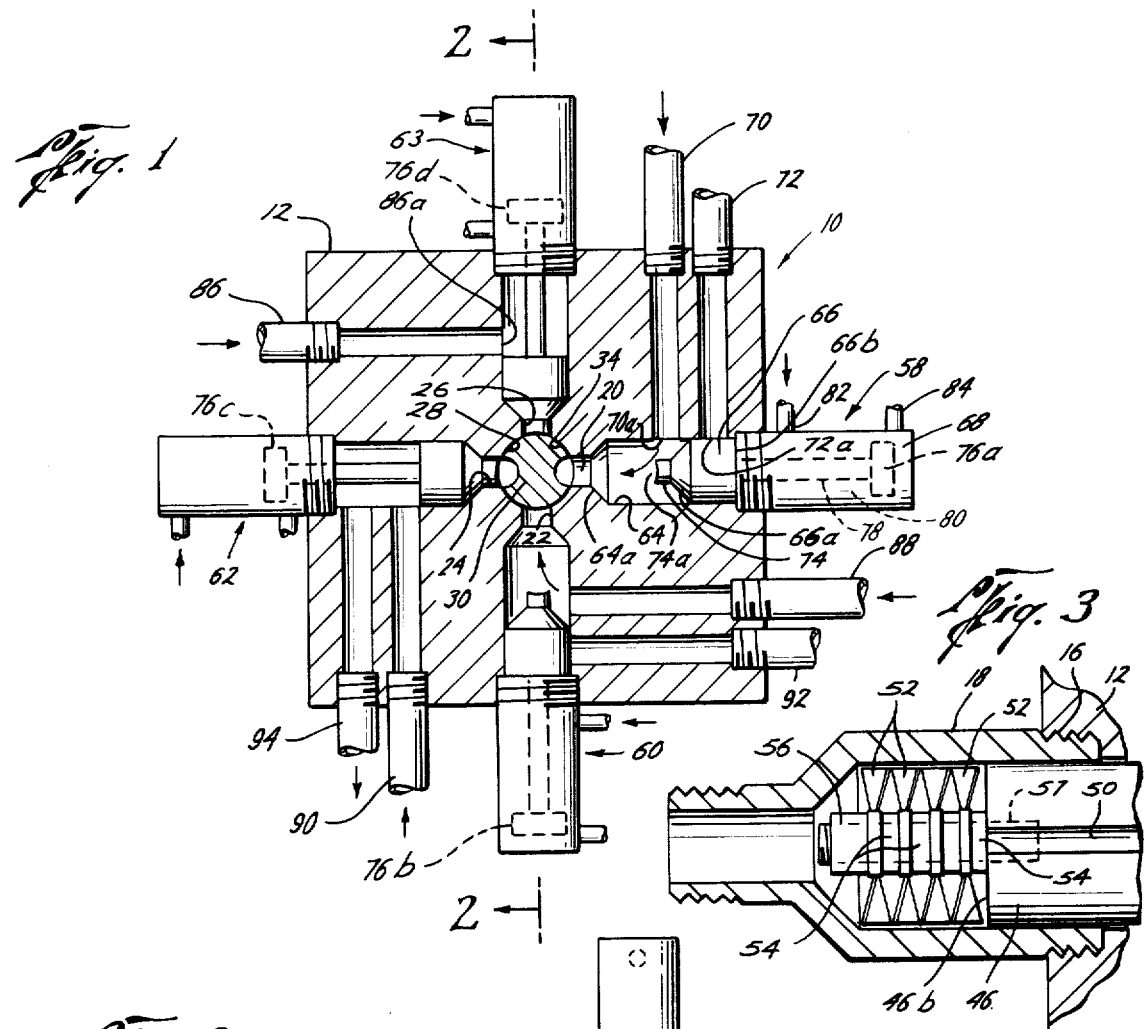
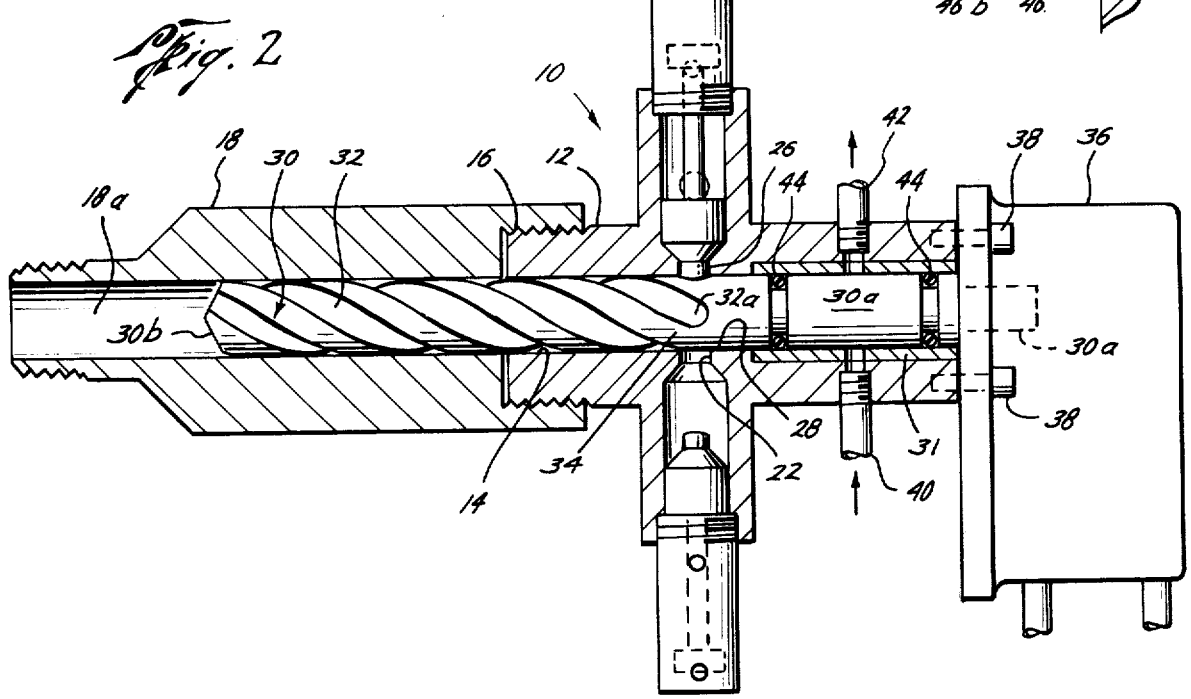

MIXING HEAD

BACKGROUND OF THE INVENTION

1. Field of the Invention

This invention relates to a mixing head for mixing fluids and more particularly to a mixing head for mixing fluids which set and harden after being mixed.

2. The Prior Art

A major disadvantage of present mixing heads for mixing fluids which set and harden upon mixing arises because of the differences in pressures at which the various fluids are injected into the mixing chamber. To inject the fluids into the mixing head, the fluids may be pumped through injection lines by means of a positive drive pump similar to the one disclosed in U.S. Pat. No. 3,838,948 issued Oct. 1, 1974 to McCorvey, the disclosure of which is incorporated herein by reference. The relative amount of each fluid injected into the mixing chamber is determined by the positive drive of the pump. The pressure at which each fluid is injected depends upon the viscosity of the fluid, the size of the orifice through which the fluid is pumped, and the amount of fluid pumped. With fluids of different viscosities, and with different amounts of each fluid being pumped, the fluids enter the mixing chamber at different pressures. A fluid that enters the chamber under a high pressure tends to back up into the lower pressure fluid injection line. The resulting mixing of the two fluids in the injection line contaminates the line and sometimes causes hardening in the line. Accordingly, it is an object of this invention to provide a mixing head where the possibility of fluids backing up into another fluid injection line is eliminated.

Another object is to provide a mixing head wherein the pressure from one line is not exerted on another line.

The texture of the mixed fluid is determined by the relative slug of fluid size (as contrasted with the relative volumetric amount) of the fluids to be mixed. With present systems it is difficult to control the slug size of the fluids to be mixed, and thus the texture of the finished product cannot easily be adjusted. It is another object of this invention to provide a mixing head which has means for controllably varying the size of the slugs of fluid to be mixed so the product texture can be controlled.

These and other objects and features of advantage of this invention will become apparent from the drawings, the claims, and detailed description which follows.

BRIEF DESCRIPTION OF THE DRAWINGS

In the drawings wherein like numerals indicate like parts, and wherein illustrative embodiments of this invention are shown, FIG. 1 is an end view partially in section and partially in elevation of a mixing chamber and its associated injection ports constructed in accordance with this invention, FIG. 2 is a side view partially in section and partially in elevation taken along line 2—2 of FIG. 1, and FIG. 3 is a fragmentary side view partly in elevation and partly in section of a modified form of chamber and valve member.

DESCRIPTION OF THE PREFERRED EMBODIMENTS

The mixing head 10 of this invention is used to mix fluids which upon mixing react, gel, harden, and/or set. The mixing head 10 of this invention, with its several modifications may include a housing 12, a mixing chamber 14–18a, ports 20, 22, 24 and 26 into the mixing chamber, a mixing chamber valve 30, port valves 58, 60, 62, 63, a mixer (provided by valve 30) in the chamber, and means for controlling the valves.

The housing 12 of the mixing head 10 is a member designed to contain some components of the mixing head 10, to provide means for connection to other components, and to provide means for connection to other apparatus operated in conjunction with the mixing head 10. The various elements that may be associated with the housing 12 will be described when other components of the mixing head 10 are described.

The fluids are mixed in a mixing chamber which includes chamber 14 located in the housing 12. At one end of the chamber 14, the housing 12 is connected through threads 16 to a connector 18 associated with a product discharge line (not shown). The product discharge line will transport the mixed fluids to the desired use point. The connector bore 18a may provide a portion of the mixing chamber as shown in the drawings.

Fluids are injected into the mixing chamber 14 through a plurality of ports 20, 22, 24 and 26. For purposes to be hereinafter explained, the port openings into mixing chamber 14 are located in close proximity to each other. In the preferred embodiments shown, the ports are radially disposed around the mixing chamber 14 in a single plane extending transverse to the mixing chamber. Fluids to be mixed are injected through ports 20, 22, and 24 or any two thereof. Port 26 provides for a wash fluid.

Means are provided to prevent fluid from one port being forced under pressure into another port by providing for successive connection of each port with the mixing chamber. To provide a portion of the system which prevents fluid from one port from backing up into another port, the section of the mixing chamber 14 where the port openings are located is a valve seat 28. A mixing chamber valve member 30 is located in the mixing chamber 14 and engages with the valve seat 28 to permit fluid from each port to be successively injected into the mixing chamber 14 while preventing fluid backup from one port to another. The mixing chamber valve member 30 has at least one passageway 32 which receives the fluids. One end 32a of the passageway is capable of being moved into successive register with each of the port openings. The end is of such a size relative to the size of the valve seat between the port openings that each end 32a of a passageway 32 can be in register with only one port opening at a time. In the embodiment shown in FIG. 2, the valve seat 28 is cylindrical, the mixing chamber valve member, indicated generally at 30, is a cylinder, and the passageway 32 is a spiral flute. In the form shown in FIG. 2 the valve member is a common drill bit. Rotation of the valve member 30 will successively move the end 32a of the flute 32 into register with each of the ports 20, 22, 24 and 26. Fluid from each port will flow into the flute 32 when the flute end 32a is in register with its opening. The mixing chamber valve member 30 also has a surface 34 which engages the mixing chamber valve seat 28 to prevent fluid cross flow between the ports. The surface 34 is of a size relative to the size of the port openings such that, if the mixing chamber valve has a plurality of passageways, then fluid can be dispensed through each port opening into only one passageway at a time. Again referring to the embodiment shown in FIG. 2, surface 34 of the valve member 30 is the cylindrical landing between the flutes 32.

The shank end 30a of mixer 30 is journaled in a suitable bearing 31. Associated with the cylindrical valve member 30 are means 36 for moving the valve 30 to successively register the end 32a of the valve member passageways 32 with the ports 20, 22, 24 and 26. The moving means 36 can be a motor 36 attached to the shank end 30a of the valve member 30. For construction convenience the moving means 36 can be connected or fastened to the housing 12 by bolts 38 or other conventional means. In the embodiment shown in FIG. 2, the mixing chamber valve member 30 will be rotated by the motor 36.

Because of the rotational speed of the valve member 30 excessive heat may build up in the housing 12. To remove this excessive heat a cooling system is provided. The cooling system may include a coolant fluid circulated around the valve member between the valve seat 28 and the moving means 36. A coolant inputs line 40 is connected to the housing 12 as is a coolant discharge line 42. Suitable seals 44, such as O-ring seals, are located on the mixing chamber valve member 30. The coolant, which may be oil, may then be circulated around the valve member 30 without contaminating the mixing chamber 14.

After the fluid is injected into the mixing chamber 14 means are provided to mix the fluid. With the embodiment shown, some mixing is accomplished in the mixing chamber valve member passageways 32. As the mixing chamber valve member 30 is rotated by the moving means 36 the end 32a of each flute 32 moves into successive register with each port 20, 22, 24 and 26. The fluid to be mixed is being pumped, by means not shown, through lines to the ports. When the end 32a of a flute 32 is in register with a port, a slug of fluid is forced into the flute 32. The flute 32 receives successive slugs of each fluid. If the mixing chamber valve member 30 is rotated at a high rate, the centrifugal reaction of the fluids causes the combined fluid to flow to the outside wall of the mixing chamber 14. At the same time, since the fluids are confined to the passageways 32 in the valve member 30, the fluids are given an angular velocity. Additionally, the walls of the mixing chamber 14 and the sides of passageway 32, due to friction, seek to retard the fluid movement. This combination of forces on the fluids causes the fluids to mix before they are ejected from the passageways 32 at end 30b of the valve member 30. Once the fluids have been ejected from the passageway 32, the momentum of the fluids results in continued angular and longitudinal movement of the fluids through the mixing chamber 14 into couplings and through the discharge tube. The continued movement continues the mixing.

If desired, additional mixing means, such as a labyrinth, a fan or other conventional means may be located in the mixing chamber. For fluids of low viscosity, the spiral fluted mixing chamber valve member 30 shown in FIG. 2 without additional mixing means has been found sufficient to provide adequate fluid mixing. For fluids of high viscosity, and for a more thorough mixing, the preferred mixing chamber valve member 46 with supplemental mixing means, shown in FIG. 3 may be utilized. The preferred valve member 46 has straight axial extending flutes 50 to provide the passageways. At the end 46a of the valve member 46 there is fastened the supplemental mixing means. The supplemental mixing means may be a series of fans 52 with spacers 54 between them. The fastening means may be a bolt 56 extending through the centers of the fans 52 and the spacers 54 and threaded into an annular recess 57 in the end 46b of the valve member 46.

Associated with each port 20, 22, 24 and 26, is a valve means for controlling the injection of fluid into the mixing chamber 14 through the port. The valve means depicted are designed to control fluid injection with a constant volume discharge pump such as the one disclosed in the aforesaid U.S. Pat. to McCorvey, but other valve means may be used. Valve means 58, 60 and 62 for ports 20, 22 and 24 respectively are identical. The components and operation of valve means 58 only will be described with the understanding that valve means 60 and 62 have identical components and operate similarly. Valve means 63 is a modified version of valve means 58, 60 and 62 and will be described separately. Valve means 58 provides means for directing the fluid either into the mixing chamber or back to a reservoir tank. The valve means 58 includes a valve seat 64, a valve member 66 and means 68 to control the valve. Passage 70, which is in communication with the product injection line, opens at one end 70a in the valve seat 64. Likewise, passage 72, which is in communication with the product bypass line and reservoir opens at one end 72a in the valve seat 64. A valve member 66 engages the valve seat 64. When the valve means 58 is open, valve member 66 cooperates with the valve seat 64 to close opening 72a of passage 72, to open opening 70a of passage 70 and to open port 20. In the open position, fluid flows through the injection line, through the valve means, through port 20 and into mixing chamber 14. When the valve means 58 is closed, valve member 66 coacts with the valve seat 64 to close port 20 and open openings 70a and 72a of passages 70 and 72. With the valve closed, fluid flows through the injection line, through the valve means and into the fluid bypass line. The fluid bypass line can lead to a fluid reservoir so that the fluid can be reused. The advantages of using such a valve means with a constant volumetric pump should now be apparent. Calibration of the pump provides a means for controlling the amount of fluid delivered to the mixing head 10. When the mixing head 10 is in operation, the valve means 58 will be open and all the delivered fluid will be injected into the mixing chamber 14. If it is desired to suddenly shut down the mixing head 10 without stopping the pump, the valve means is closed and, although the same amount of fluid continues to be delivered to the mixing head 10, the fluid is returned through the bypass line to a reservoir for later use. The shown valve means 58 is designed to perform these functions. The valve seat 64 is generally cylindrical with a conical seat end 64a extending between port 20 and the cylindrical seat 64. The openings 70a and 72a of the input 70 and bypass 72 passages respectively are axially spaced along the cylindrical seat 64. The valve member 66 is generally cylindrical and of such an outside diameter relative to the inside diameter of the valve seat 64 that fluid cannot flow in the annulus between the valve seat 64 and the valve member 66. A conical end 66a engages the conical seat end 64a. A nipple 74 on the tip of the conical end 66a fits inside port 20 to completely close the port. When the valve means is closed, the tip 74a of the nipple 74 will be adjacent the mixing chamber valve seat 28. The nipple tip 74a should conform to the shape of the mixing chamber valve seat 28. With this conformity of shape and with the nipple surfaces engaging the port surfaces, even though there is other fluid in the mixing chamber it will not be able to back up into the closed port or valve means. At the same time, when the valve is closed, the back surface 66b of the valve member 66 is between port 20 and opening 70a of fluid input passage 70. Injected fluid thus flows through the valve means and out the bypass line 72. When the vavle means 54 is opened the valve member 66 blocks opening 72a of the bypass passage 72 and fluid flows from the input passage 70 to the mixing chamber 14. Suitable means 68 for controlling the valve means 54 are provided. The control means 68 may include a piston 76 on a rod 78 attached to the back end 66b of the valve member 66 in a piston chamber 80. Hydraulic control lines 82 and 84 provide hydraulic fluid to move the piston 76 which moves the valve member 66.

Valve means 63 differs from valve means 58, 60 and 62 only in that valve means 63 does not have an opening to a fluid bypass line. Only a fluid input line 86 opens, at opening 86a into valve means 63. When valve means 63 is closed, as shown in FIGS. 1 and 2, the valve member is disposed between the fluid input line opening 86a and the port 26 to engage the valve seat to prevent fluid flow between the input line opening 86a and port 26.

In operation of the mixing head 10, valve means 58 can control injection of a resin such as polyurethane, valve means 60 can control injection of a suitable promoter, valve means 62 can control injection of a filler or a fireproofing material, and valve means 63 can control injection of a suitable cleaner such as methylene chloride. The fluid components are all stored in separate supply sources not shown. A constant volumetric pump, such as that disclosed in the aforementioned patent, is calibrated to control the percentage of resin, promoter, and filler in the final product. The pump is turned on. Valve means 58, 60 and 62 are opened while valve means 63 is closed. The motor 36 is actuated to rotate the mixing chamber valve member 30. The fluid components, under the control of the pump, flow from the supply source through their respective input lines 70, 88 and 90 through valve means 58, 60 and 62 and through ports 20, 22 and 24. Owing to the rotation of mixing chamber valve member 30, ends 32a of fluted passageways 32 will be moved into successive registry with ports 20, 22 and 24. As ends 32a move into registry with ports 20, 22 and 24, fluted passageways 32 will successively receive a slug of resin, promoter, and filler. Surface 34 on the mixing chamber valve member 30 will prevent the resin, promoter, and filler from backing up into a different port. Rotation of the mixing chamber valve member 30 both mixes the slugs of fluids in the manner aforedescribed and causes the fluids to flow down fluted passageway 32 to the end 30b of the valve member and into the open mixing chamber 14. If additional mixing means are attached to the end 30b of valve member, the fluids will flow through these means and be more thoroughly mixed. The mixed fluids then flow through coupling 18 to the discharge tube, not shown, to the use point.

It can be appreciated that if the supply of fluids to the mixing head 10 is held constant, a faster rotation of the mixing chamber valve member 30 will result in smaller slugs of fluid being received in passageway 32. The texture of the finished mixed product is generally controlled by the size of the slugs of the mixed fluids. Thus, with a variable speed motor 36, the texture of the final product can be controllably varied by changing the revolutions per minute of the mixing chamber valve member 30. With sufficient testing, a graph can be made of texture versus RPMs for a given constant source of fluid supply. The graph will enable an operator to produce a mixed product of the desired texture simply by adjusting the RPMs of the mixing chamber valve member 30.

If it is desired to suddenly shut down the mixing head, valve members 66 of injection ports valve means 58, 60 and 62 can be closed by actuation of pistons 76a, 76b and 76c. Even though the constant volumetric pump is still running, the injection lines 70, 88 and 90 will not rupture since the pumped fluid may be returned to the reservoirs (not shown) through fluid bypass lines 72, 92 and 94. When injection ports 20, 22 and 24 are closed by their respective valve means 58, 60 and 62, valve means 63 can open injection port 26 so that the cleaner may be injected into the mixing chamber 14. The ability to instantaneoulsy shut down the injection of product fluids into the mixing chamber 14 by providing for automatic product flow back to the reservoir so that the mixing chamber may be cleaned out saves down time and also results in minimal product fluid loss. In addition, because all fluids are injected into the mixing chamber 14 at the mixing chamber valve seat 28 and are received in passageways 32 of the mixing chamber valve member 30, the mixing chamber 14 is cleaned without any fluid backup into the produce fluid injection ports 20, 22 and 24 and the associated produce fluid valves, lines, and reservoirs.

From the foregoing detailed description it can be seen that the objects of this invention have been achieved. A mixing head has been provided which eliminates the possibility of fluid from one product injection line backing up into another fluid's product injection line. In addition, the final product texture of the mixed fluids can be controlled. The disclosed mixing head also has means for instantaneously shutting down the injection of product fluids into the mixing chamber for cleaning or other purposes.

The foregoing disclosure and description of the invention are illustrative and explanatory thereof and various changes in the size, shape and materials, as well as in the details of the illustrated construction may be made within the scope of the appended claims without departing from the spirit of the invention.

What is claimed is:

1. A mixing head comprising:
   a housing;
   an internal mixing chamber in said housing for mixing fluids;
   a section of said chamber providing a cylindrical valve seat;
   a plurality of ports opening into said valve seat;
   a cylindrical mixing chamber valve member;
   at least one passageway in said valve member with one end of said passageway movable into and out of register with each of said ports;
   a surface on said valve member engageable with said cylindrical valve seat to prevent cross flow between said ports;

means for moving said valve member to successively register said passageways of said valve member with said ports;
means in said chamber for mixing fluids; and
valve means associated with each port including:
   a conical valve seat opening into a cylindrical valve seat,
   a first passage opening into the cylindrical valve adapted for communication with a injection line,
   a second passage opening into the cylindrical valve seat adapted for communication with a bypass line,
   a valve member engaging said cylindrical valve seat and adapted to permit product to flow from the first passage through the chamber formed by the cylindrical valve seat through the port and into the mixing chamber when said valve member is in an open position and adapted to permit product to flow from the first passage through the chamber formed by the cylindrical valve seal to the second passagement when said valve member is in a closed position, and
      means for opening and closing said last mentioned valve member.

2. A mixing head comprising:
a housing;
an internal mixing chamber in said housing for mixing fluids;
a section of said chamber providing a cylindrical valve seat;
a plurality of ports opening into said valve seat;
a cylindrical mixing chamber valve member;
at least one passageway in said valve member with one end of said passageway movable into and out of register with each of said ports;
   a surface on said valve member engageable with said cylindrical valve seat to prevent cross flow between said ports;
   means for moving said valve member to successively register said passageways of said valve member with said ports;
means in said chamber for mixing fluids; and
valve means associated with each port including:
   a valve seat opening into a valve chamber,
   said valve chamber communicating with said mixing chamber through said port,
   a valve member movable within said valve chamber between positions engaging said valve seat and disengaging said valve seat,
   said last mentioned valve member having a nipple which fits inside the port to completely close the port, and
   said nipple having a tip which conforms to the shape of the mixing chamber valve seat and is adjacent the mixing chamber valve seat when said last mentioned valve member engages the valve seat.

3. The mixing head of claim 2 wherein the passageway of the cylindrical mixing chamber valve member comprises a spiral flute and the end of the passageway is moved into and out of register with each of said ports by rotating said cylindrical mixing chamber valve member.

4. The mixing head of claim 2 wherein the passageway of the cylindrical mixing chamber valve member comprises a straight axial flute and the end of the flute is moved into and out of register with each of the ports are rotating said cylindrical mixing chamber valve member.

5. The mixing head of claim 2 additionally including:
mixing means attached to the end of said mixing chamber valve member.

6. A mixing head comprising:
a housing;
an internal mixing chamber in said housing for mixing fluids;
a section of said chamber providing a valve seat;
a plurality of ports opening into said valve seat;
means in said chamber for mixing fluids; and
a valve means associated with each of said ports, said valve means including:
   a valve seat opening into a valve chamber,
   said valve chamber communicating with said mixing chamber through said port,
   a valve member movable within said valve chamber between positions engaging said valve seat and disengaging said valve seat,
   said valve member having a nipple which fits inside the port to completely close the port, and
   said nipple having a tip which conforms to the shape of the mixing chamber valve seat and is adjacent the mixing chamber valve seat when the valve member engages the valve seat.

7. A mixing head comprising:
a housing
an internal mixing chamber in said housing for mixing fluids;
a section of said chamber providing a valve seat;
a plurality of ports opening into said valve seat;
a mixing chamber valve member;
at least one passage way in said valve member with one end of said passageway movable into and out of register with each of said ports;
   a surface on said valve member engageable with said valve seat to prevent cross flow between said ports;
   means for moving said valve member to successively register said passageway of said valve member with said ports;
means in said chamber for mixing fluids; and
valve means associated with each port including:
   a valve seat opening into a valve chamber,
   said valve chamber communicating with said mixing chamber through said ports,
   a valve member movable within said valve chamber between positions engaging said valve seat and disengaging said valve seat,
   said valve member having a nipple which fits inside the port to completely close the port, and
   said nipple having a tip which conforms to the shape of said mixing chamber valve seat and is adjacent the mixing chamber valve seat when the valve member engages the valve seat.

8. A mixing head comprising:
a housing;
an internal mixing chamber in said housing for mixing fluids;
a section of said chamber providing a valve seat;
a plurality of ports opening into said valve seat;
a mixing chamber valve member;
at least one passageway in said valve member with one end of said passageway movable into and out of register with each of said ports;
a surface on said valve member engageable with said valve seat to prevent cross flow between said ports;
means for moving said valve member to successively register said passageway of said valve member with said ports;

means in said chamber for mixing fluids; and
a valve means associated with each port including:
 a conical valve seat opening into a cylindrical valve seat,
 a first passage opening into the cylindrical valve seat adapted for communication with an injection line,
 a second passage opening into the cylindrical valve seat adapted for communication with a bypass line,
 a valve member engaging said cylindrical valve seat and adapted to permit fluid to flow from the first passage through the chamber formed by the cylindrical valve seat through the port and into the mixing chamber when said valve member is in an open position and adapted to permit products to flow from the first passage through the chamber formed by the cylindrical valve seat to the second passage when said valve member is in a closed position, and
 means for opening and closing said last mentioned valve member.

* * * * *